United States Patent [19]

McCullough et al.

[11] 4,047,667
[45] Sept. 13, 1977

[54] SUPPORT SYSTEM FOR ROCKET THRUST NOZZLES

[75] Inventors: Edward E. McCullough, Brigham City; Stewart H. Greenwood, North Ogden; Hoyt Sherard, Jr., Pleasant View, all of Utah; Richard D. McDonald, Garland, Tex.; Ronald G. Hirschi, North Ogden, Utah; Alfred R. Randall, Brigham City, Utah

[73] Assignee: Thiokol Corporation, Newtown, Pa.

[21] Appl. No.: 594,925

[22] Filed: July 10, 1975

[51] Int. Cl.² .................................... B64C 15/04
[52] U.S. Cl. .................................. 239/265.35
[58] Field of Search ............... 239/265.35; 60/232, 60/271; 285/227, 228, 263

[56] References Cited

U.S. PATENT DOCUMENTS

| | | | |
|---|---|---|---|
| 2,579,619 | 12/1951 | Scott | 285/228 |
| 3,446,437 | 5/1969 | McCullough et al. | 60/232 X |
| 3,698,192 | 10/1972 | LeFebvre, Jr. | 239/265.35 X |

*Primary Examiner*—John J. Love

*Attorney, Agent, or Firm*—Stanley A. Marcus; Edward E. McCullough

[57] ABSTRACT

A system for mounting a movable thrust nozzle to a rocket case, wherein a plurality of cups surrounding the nozzle is fixed in a common plane to one of the members (the nozzle or case) and a plurality of plugs, each loosely fitting into a corresponding one of the cups, is fixed to the other member. The plugs and cups are arranged so that they tend to be forced together by pressure of propulsive gases of the rocket. A bladder, partially filled with fluid, is confined in each cup by its plug. Tubes connect either adjacent or diametrically opposite bladders; so that fluid may be displaced and exchanged between bladders as the nozzle is moved for steering the rocket. Hydraulic actuators may be interposed in tubes connecting diametrically opposite bladders for forcibly moving fluid from one to the other, and thereby move the nozzle. Alternatively, each bladder may be connected directly to a source of hydraulic fluid and be selectively inflated or deflated thereby for moving the nozzle. A gastight seal is provided between nozzle and case.

1 Claim, 8 Drawing Figures

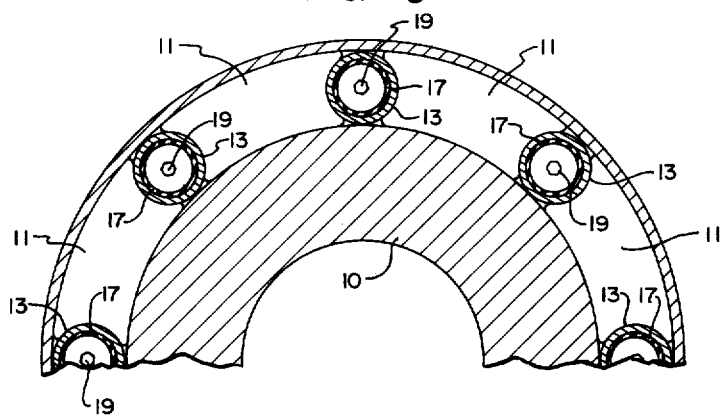
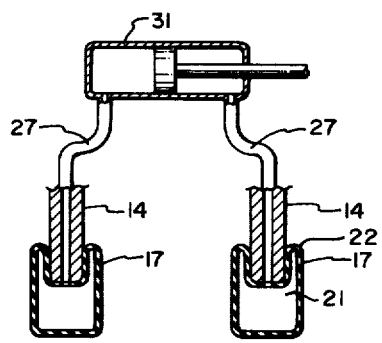
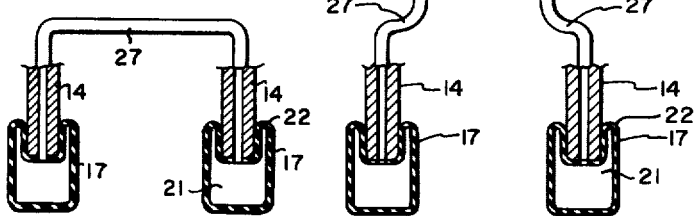
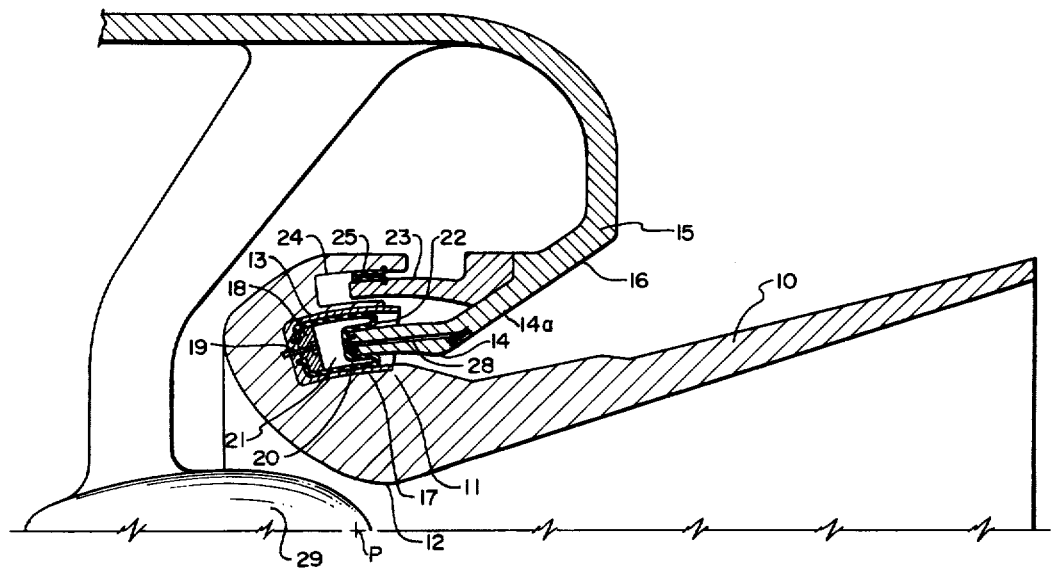

SUPPORT SYSTEM FOR ROCKET THRUST NOZZLES

The invention described herein was made during the course of or under Contract No. N0003072C0108 with the U. S. Navy.

CROSS REFERENCE TO RELATED APPLICATIONS

This invention is somewhat related to that of application Ser. No. 636,402 "Rocket Nozzle Support and Pivoting System" by E. McCullough, et al, filed May 5, 1967, now U.S. Pat. No. 3,446,437.

BACKGROUND OF THE INVENTION

This invention relates to systems for mounting movable thrust nozzles to rocket cases; more specifically, it relates to frictionless systems wherein the nozzle is mounted to the rocket case by a fluid-filled bearing.

Such systems are known in the art; but the known systems have certain disadvantages that are overcome by the present invention.

U.S. Pat. No. 3,446,437, cited above, describes a rocket nozzle supported relative to a rocket case by an annular, fluid-filled bladder divided into cells by partitions. Diametrically opposite cells are connected together by tubes and hydraulic actuators are interposed in the tubes, whereby fluid may be removed from one cell and pumped into the other to move the nozzle and steer the rocket. Disadvantages of this system are that the annulus of fluid imparts considerable weight of inert parts to the rocket, the entire annulus must be made in one piece, and considerable stress is impressed on the partitions of the bladder when fluid pressure in adjacent cells is made unequal.

U.S. Pat. No. 3,698,192 "Universal Joint Employing a Fluid Bearing for a Movable Nozzle" by C. A. LeFebvre and U.S. Pat. No. 3,727,408 "Universal Joint Employing a Fluid Bearing" by S. A. Martin both show annular volumes of fluid, as applied to rockets; and, hence, they impart the same weight penalty as the invention described in Patent No. 3,446,437.

In addition to the weight problem an annular bladder is difficult to manufacture, and the cost increases dramatically with the size of the bladder. Also, a defect in any part thereof necessitates discarding the entire bladder.

SUMMARY OF THE INVENTION

The present invention, which overcomes these difficulties of the prior art, is a system for mounting a movable thrust nozzle to a rocket case. It provides a frictionless bearing means, but incorporates considerably less weight than those described above, and is easier and less expensive to manufacture. In addition, this fluid-bearing means can be used as actuation means for controlling the rocket.

A plurality of essentially cylindrical cups is fixed either to the thrust nozzle or to the rocket case surrounding the aperture thereof. A plurality of corresponding plugs, each of which fits loosely into one of the cups, is fixed to the other member. A fluid containing bladder is held in each cup between the cup and plug. Each bladder is only partially filled with fluid, so that it forms a convolution, wherein it folds upon itself, about its plug to provide a frictionless bearing. The cups and plugs are arranged so that they tend to be forced together by propulsive gases of the rocket.

In one embodiment, adjacent bladders are connected by tubes to permit a free exchange of fluid; so that fluid may flow from some bladders and into others when the nozzle is moved relative to the rocket motor by actuators.

In another embodiment, all bladders are connected directly to a conventional source of hydraulic fluid that may selectively pressurize some bladders and withdraw fluid from others. In this way, the bladders may function not only as bearings, but also as means of moving the nozzle for steering the rocket. This embodiment may also be used for moving the nozzle axially relative to a fixed, pintle-type valving member that may be positioned inside the rocket, upstream of the throat, by pressurizing or diminishing the fluid in all bladders to the same extent simultaneously. In this way, the effective throat area may be varied as desired for altering thrust of the rocket. Also, diametrically opposite bladders may be connected together by tubes, with hydraulic actuators interconnected in the tubes, whereby a constant quantity of fluid may be apportioned as desired between the pair of bladders for steering the rocket (see FIG. 6).

Objects of the invention are to provide a frictionless, fluid bearing means for mounting a movable thrust nozzle to a rocket, that is lighter in weight and easier to manufacture than conventional fluid bearings; to provide such a mounting means that may also be used to rotate the nozzle for steering the rocket; and to provide such a mounting means that may also be used to move the throat of the nozzle axially relative to a fixed valving member to vary the effective area of the throat, and thereby alter the thrust of the rocket.

Other objects and advantages of the invention will become apparent as the following description is read with reference to the accompanying drawings. The same parts are designated by the same numbers throughout the disclosure.

DESCRIPTION OF THE DRAWINGS

In the drawings:

FIG. 5 is a cross section taken on Line 5—5 of FIG. 4;

FIG. 6 is a diagram showing how fluid may be exchanged between diametrically opposite bladders via a hydraulic actuator;

FIG. 7 is similar to FIG. 6, but shows fluid connection between diametrically opposite bladders without an intervening hydraulic actuator; and FIG. 8 is a third embodiment of the invention shown in a view similar to FIG. 1.

DESCRIPTION OF THE PREFERRED EMBODIMENTS

Figure 1:
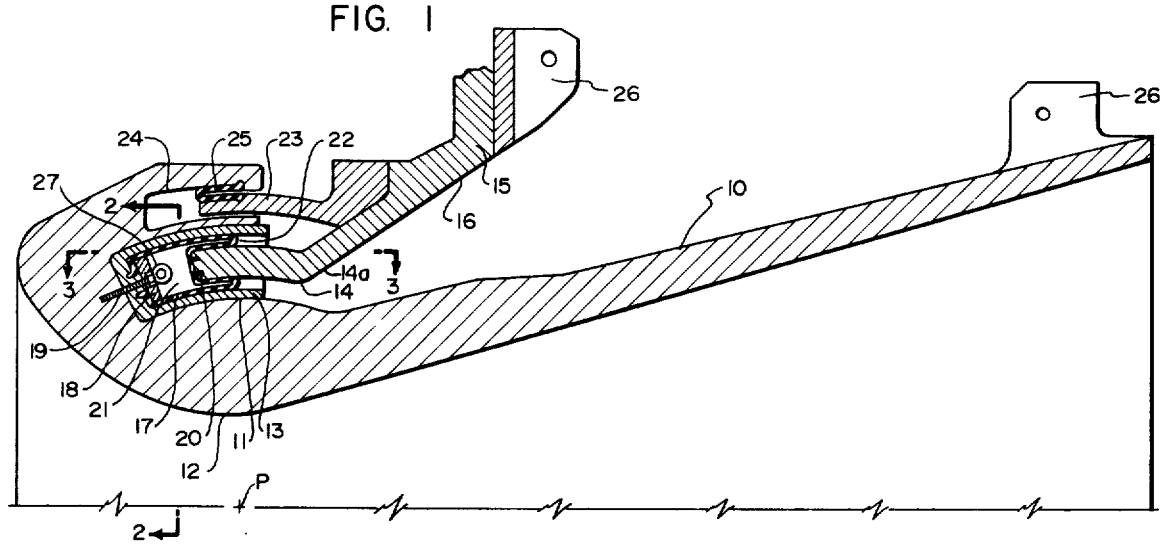
FIG. 1 is a longitudinal section of the invention.

A movable thrust nozzle 10 has an annular recess 11 about the throat portion 12, providing a first support in which a plurality of cups 13 are equally spaced about the nozzle 10 and open aftwardly. Although the cups 13 are substantially cylindrical, they may be curved about the center P of rotation of the nozzle 10, as shown in FIG. 1. A plurality of forwardly extending plugs 14 are fixed to a second support in the form of an annular flange 14a on the rocket case 15, about the aperture 16 thereof. Each plug 14 fits loosely into a corresponding one of the cups 13.

A cylindrical bladder 17 is fastened into each of the cups 13 by some means, such as a retaining plate 18 and screw 19 (see FIG. 1). The other end of each bladder 17 may be attached to its corresponding plug 14 by screws 20. Each bladder 17 is partially filled with a fluid 21, so that it folds upon itself to create a convolution 22 about its plug 14. In this way, the fluid containing bladder 17 provides a frictionless bearing for mounting the nozzle 10 to the rocket case 15.

Although the fluid 21 may be any gas or liquid that would be noncorrosive, noncombustible, and otherwise stable under the intended ambient conditions, the preferred fluid is an incompressible liquid, having low freezing and high boiling points, such as a silicone oil, ethylene glycol, or any of various hydraulic fluids. Viscosity of the fluid 21 is an important design parameter that must be tailored for optimum performance of a given system. Whereas fluids of high viscosity have the desirable property of damping extraneous vibrations, fluids having a low viscosity tend to provide a system that is more rapidly responsive to commands. When a liquid is used, care is taken to insure that no air is included in the bladders or their connecting tubes.

The bladders 17 must be made of a material that is very flexible but has a high tensile strength. A preferred material is a high temperature rubber of the Buna-N type that is reinforced by fibers of glass, Nylon, and other high strength materials.

It will be noted that the cups 13 and plugs 14 are interchangeable, i.e., the cups 13 may be mounted to the rocket case 15 and the plugs 14 may be mounted to the nozzle member 10 without altering the function of the invention. However, the cups 13 and plugs 14 must be arranged so that they would tend to be forced together be propulsive gases of the rocket. The bladders 17 could not function as bearings if, for example, aftwardly extending plugs 14 were attached to the case 15 and forwardly opening cups 13 were attached to the nozzle 10, and the predominant load exerted on the nozzle by the propulsive gases were to force it outwardly from the rocket.

An annular, guide flange 23 is fixed to the rocket case surrounding the aperture 16 therein. This flange 23 fits slidably into a second annular recess 24 in the nozzle member 10, surrounding the throat portion 12. Both the flange 23 and the recess 24 are curved to conform to surfaces of spheres concentric about the point of rotation P. A strong, cylindrical seal 25, formed of an annulus of high temperature rubber, is folded upon itself to permit motion, and is attached at one edge to the guide flange 23 and at its other edge to the wall of the recess 24, effectively providing a gastight seal between the nozzle member 10 and the rocket case 15.

Brackets 26 are provided on the rocket case 15 and on the nozzle member 10 for attachment of hydraulic actuators, not shown, that move the nozzle 10 relative to the case 15 for steering the rocket. These actuators are only applicable to the embodiment of the invention shown in FIGS. 1 and 2.

Figure 2:
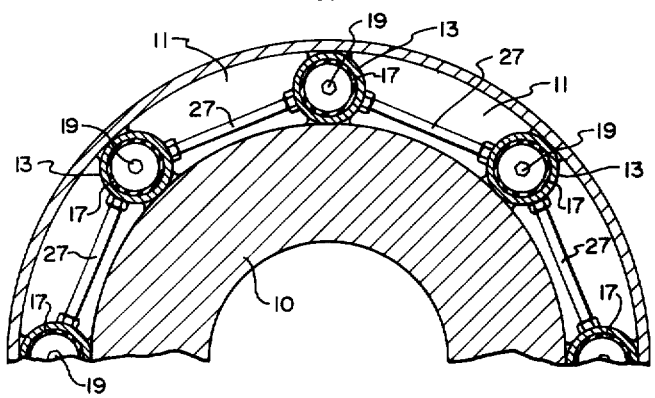
FIG. 2 is a cross section taken on Line 2—2 of FIG. 1.

In the embodiment shown in FIGS. 1 and 2, adjacent bladders 17 are connected together by tubes 27, that permit free flow of fluid from bladder to bladder; so that, as the actuators rotate the nozzle 10, fluid may flow from bladders 17 on one side of the nozzle 10 to those on the other side. Alternatively, the tubes 27 may connect pairs of bladders that are diametrically opposite one another. (see FIG. 7.) A hydraulic actuator 31, connected into each tube 27 may be used for selective inflation of the bladders 17 to move the nozzle 10 (See FIG. 6.)

Figure 3:
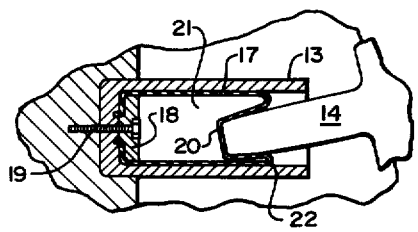
FIG. 3 is a fragmentary section taken on Line 3—3 of FIG. 1, with the nozzle member rotated to an extreme position in a plane perpendicular to the line of sight.

FIG. 3 shows the relative positions of a plug 14 and its corresponding cup 13 as the nozzle member 10 is rotated into its extreme position of 12° from the axis of the rocket in a plane at right angles to the line of sight. As shown, the sides of the plug 14 are curved to permit such motion relative to the sides of the cup 13.

Figure 4:
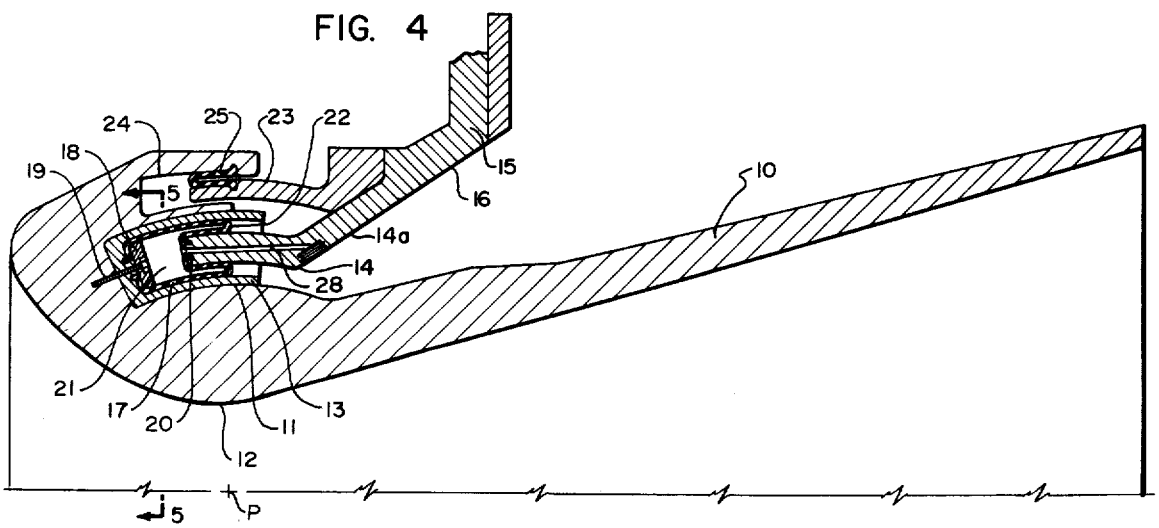
FIG. 4 is a view similar to FIG. 1, but showing an alternate form of the invention.

FIGS. 4 and 5 show another embodiment of the invention wherein all parts are identical to those of FIGS. 1, 2 and 3 except that the tubes 27 connecting adjacent bladders 17 are eliminated, as are the actuator brackets 26. Instead, each bladder 17 is connected directly to a conventional source of hydraulic fluid, not shown, via a duct 28 in each plug 14, whereby it may be inflated or deflated to the extent desired. In this way, the bladders 17 may be used as actuators, i.e. by being selectively pressurized to move the nozzle 10 and steer the rocket.

Also, by altering the base level of inflation of all bladders 17 to the same extent simultaneously, the nozzle member 10 may be moved forward or aft along the axis of the rocket relative to a fixed, pintle-type, valving member 29 mounted inside the rocket motor (see FIG. 8). In this way, it is possible to vary the effective throat area of the nozzle to control the thrust of the rocket, or to extinguish certain types of pressure-sensitive propellants. To permit such axial motion of the nozzle member 10, however, it is necessary to compromise the dimensional tolerances of spherical surfaces concentric about the point P of rotation somewhat. The base level of inflation of the bladders 17 determines the position of point P on the axis of the rocket.

An invention has been described that advances the art of rocket technology. Although the embodiments have been described specifically with regard to detail, it should be noted that many such details may be altered without departing from the scope of the invention, as it is defined in the following claims.

The invention claimed is:

1. In a rocket having a case with an aft aperture therein and a movable thrust nozzle in the aperture, a system for mounting the thrust nozzle to the rocket case comprising:

a plurality of cups surrounding the nozzle and fixed to one of said members (i.e. the nozzle and case) in a common plane perpendicular to the axis thereof;

a plurality of plugs fixed to the other said member, so that each plug fits loosely into a corresponding one of the cups, the plugs and cups being arranged so that they tend to be forced together by pressure of propulsive gases of the rocket;

a fluid containing bladder in each cup, separating each cup from its corresponding plug — each bladder being partially filled with fluid so that it forms a convolution, folding upon itself around the corresponding plug;

means for permitting fluid content of each bladder to be varied in quantity comprising a tube connected at one to a source of hydraulic fluid, capable of supplying fluid under pressure to the bladder and of withdrawing fluid from the bladder, and connected at the other end to a duct in the plug that extends therethrough to the interior of the bladder; and means for providing a gastight seal between the nozzle and the rocket case.

* * * * *